US008573520B2

(12) United States Patent
Goedert et al.

(10) Patent No.: US 8,573,520 B2
(45) Date of Patent: Nov. 5, 2013

(54) METHOD OF PRODUCING PULVERIZED COAL

(75) Inventors: Paul Goedert, Mondorf-les-Bains (LU); Markus Mayer, Trier (DE); Georges Stamatakis, Canach (LU); Bernard Cauwenberghs, Koerich (LU)

(73) Assignee: Paul Wurth S.A., Luxembourg (LU)

( * ) Notice: Subject to any disclaimer, the term of this patent is extended or adjusted under 35 U.S.C. 154(b) by 234 days.

(21) Appl. No.: 13/144,445

(22) PCT Filed: Jan. 21, 2010

(86) PCT No.: PCT/EP2010/050689
§ 371 (c)(1),
(2), (4) Date: Jul. 13, 2011

(87) PCT Pub. No.: WO2010/084156
PCT Pub. Date: Jul. 29, 2010

(65) Prior Publication Data
US 2011/0271587 A1      Nov. 10, 2011

(30) Foreign Application Priority Data

Jan. 21, 2009   (LU) .......................................... 91517

(51) Int. Cl.
*B02C 19/00*          (2006.01)
(52) U.S. Cl.
USPC .............................................. 241/18; 241/23
(58) Field of Classification Search
USPC ............... 241/18, 19, 23, 47, 48; 44/620, 505
See application file for complete search history.

(56) References Cited

U.S. PATENT DOCUMENTS 4,541,572 A     9/1985    Tamura et al.

FOREIGN PATENT DOCUMENTS

CN        1257757 A       6/2000
CN        101000141 A     7/2007
(Continued)

OTHER PUBLICATIONS

Chinese First Office Action issued Jan. 15, 2013 re: CN Appln No. 201080005009.1; pp. 16.

(Continued)

*Primary Examiner* — Mark Rosenbaum
(74) *Attorney, Agent, or Firm* — Cantor Colburn LLP

(57) ABSTRACT

A method for producing pulverized coal including the steps of providing a drying gas heated to a predefined temperature in a hot gas generator; feeding the heated drying gas into a pulverizer; introducing raw coal into the pulverizer, the pulverizer grinding the raw coal into pulverized coal; collecting a mixture of drying gas and pulverized coal from the pulverizer and feeding the mixture to a filter, the filter separating the dried pulverized coal from the drying gas; collecting the dried pulverized coal for further use and feeding the drying gas from the filter to an exhaust line; and collecting the drying gas exiting the filter and feeding part of the collected drying gas to a recirculation line for feeding recirculation drying gas to the hot gas generator. According to an important aspect of the present invention, the step of providing the drying gas includes feeding a variable flow rate of hot stove waste gas to the hot gas generator through a hot stove waste gas line so as to maximize the amount of hot stove waste gas used as drying gas. A pressure of the drying gas at a pulverizer gas inlet is controlled by regulating a flow rate of the hot stove waste gas through the hot stove waste gas line.

16 Claims, 1 Drawing Sheet

(56) References Cited

FOREIGN PATENT DOCUMENTS

| | | | |
|---|---|---|---|
| CN | 101250601 A | | 8/2008 |
| DE | 3025512 | * | 1/1982 |
| JP | 57-145908 A | | 9/1982 |
| JP | 58-64409 | * | 4/1983 |
| JP | 59-145711 A | | 8/1984 |
| JP | 62-123217 | * | 6/1987 |
| KR | 2004-0003630 A | | 1/2004 |

OTHER PUBLICATIONS

International Search Report issued Jun. 15, 2010 by European Patent Office re: PCT/EP2010/050689; citing JP 57-145908, US 4,541,572, JP 59-145711 and KR 2004-0003630.

* cited by examiner

METHOD OF PRODUCING PULVERIZED COAL

TECHNICAL FIELD

The present invention generally relates to a method for the production of pulverized coal, in particular for use in the metallurgical industry.

BACKGROUND

In the metallurgical industry, pulverized coal is generally injected as combustible into blast furnaces. It is important, in order to ensure good functioning of the blast furnace, that the pulverized coal is of good quality, i.e. that the pulverized coal has the right particle size distribution and the lowest humidity level. The pulverized coal is generally produced in a grinding and drying installation, wherein raw coal is ground, dried and classified before the resulting pulverized coal is fed to a storage bin before being injected into a blast furnace. The water contained in the freshly ground coal is spontaneously evaporated with carrying out the mixture by a stream of hot drying gas from the pulverizer into a filter. Inside the filter, the pulverized coal is separated from the drying gas stream and fed to the storage bin. Part of the drying gas is recirculated and mixed with combustion waste gas inside a hot gas generator before it is reintroduced into the pulverizer. The remaining portion of the drying gas is evacuated via an evacuation line leading to a stack.

The recirculation of drying gas allows operating the circuit on a self-inert basis and having a suitable temperature of the drying gas at the pulverizer gas inlet of about 300° C. The recirculation of drying gas however also has its drawbacks; these are a high dew point of the drying gas and high fuel gas consumption for the combustion inside the hot gas generator.

It has been suggested to use waste gas from a hot stove plant as drying gas in the grinding and drying installation. Waste gas exiting such a hot stove plant generally has a temperature of about 100 to 350° C., depending on the operation of the hot stove plant. This hot stove waste gas is sucked by a fan at the stove off-gas collector and conveyed to the grinding and drying installation. More particularly, the hot stove waste gas is fed into the recirculation line and mixed with recirculation drying gas and combustion waste gas of the hot gas generator. The hot stove waste gas is added at a fixed flow rate to the circuit. The fixed flow rate of hot stove waste gas has to be sufficiently low, such that a certain flow rate of recirculation drying gas is always used. This is indeed necessary to be able to control the pressure of the drying gas at the pulverizer gas inlet. Also, the composition of hot stove waste gas may present undesired peaks of CO and $O_2$. It must therefore be possible to shut-off the supply of hot stove waste gas and switch to a conventional operating mode wherein only recirculation drying gas is mixed with the combustion waste gas inside the hot gas generator. In order to regulate the pressure of the drying gas at the pulverizer gas inlet, a control damper in the evacuation line is operated in such a way as to adjust the pressure distribution inside the grinding and drying circuit.

The main disadvantage of this system is that the hot stove waste gas is added to the circuit at a fixed flow rate and that, therefore, hot stove waste gas cannot be used in a more energetically efficient way.

BRIEF SUMMARY

The invention provides an improved method for producing pulverized coal, which does not present the drawbacks of the prior art methods. The invention proposes a method for producing pulverized coal, the method comprising the steps of:
- providing a drying gas heated to a predefined temperature in a hot gas generator;
- feeding the heated drying gas into a pulverizer;
- introducing raw coal into the pulverizer, the pulverizer grinding the raw coal into pulverized coal;
- collecting a mixture of drying gas and pulverized coal from the pulverizer and feeding the mixture to a filter, the filter separating the dried pulverized coal from the drying gas;
- collecting the dried pulverized coal for further use and feeding the drying gas from the filter to an exhaust line; and
- collecting the drying gas exiting said filter and feeding part of said collected drying gas to a recirculation line for feeding recirculation drying gas to said hot gas generator.

According to an important aspect of the present invention, the step of providing the drying gas comprises feeding a variable flow rate of hot stove waste gas to the hot gas generator through a hot stove waste gas line, said flow rate of hot stove waste gas being chosen so as to maximize the amount of hot stove waste gas used as drying gas; and a pressure of the drying gas at a pulverizer gas inlet is controlled by regulating a flow rate of the hot stove waste gas through the hot stove waste gas line.

By using a variable flow rate of hot stove waste gas, the use of hot stove waste gas can be increased if allowed by the operating conditions. This is in contrast to prior art methods, wherein a fixed flow rate of hot stove waste gas is used and wherein such flow rate must be sufficiently low, such that a certain flow rate of recirculation drying gas is always used to control the pressure of the drying gas.

By increasing the flow rate of hot stove waste gas, the necessity to use the hot gas generator to further heat the drying gas can be reduced. Considerable savings can therefore be made by reducing the fuel gas consumption for the combustion inside the hot gas generator.

Preferably, the flow rate of the hot stove waste gas is regulated by means of a hot stove waste gas fan arranged in the hot stove waste gas line. The total flow rate of the drying gas may be regulated by means of a main fan arranged in the exhaust line.

It should be noted that the term "fan" in the context of the present invention is to be understood as any fan allowing modifying the volume flow rate of gas through the fan. Such a fan may e.g. be a fan with a variable frequency motor or a fan with a fixed frequency motor having a damper arranged upstream or downstream of the fan.

A recirculation line is provided for feeding drying gas from the exhaust line to the hot gas generator, allowing the grinding and drying installation to be operated in various operating modes.

The method according to the present invention preferably comprises a hot stove waste gas operating mode, wherein:
- the recirculation line is shut-off, such that no recirculation drying gas is fed to the hot gas generator;
- the hot stove waste gas line is open, such that only hot stove waste gas is fed at a variable flow rate to the hot gas generator;
- the pressure of the drying gas at the pulverizer gas inlet is controlled by setting a flow rate of the drying gas in the exhaust line and by regulating the flow rate of the hot stove waste gas through the hot stove waste gas line.

Most of the energy necessary to evaporate the humidity of the coal after grinding is provided by the hot stove waste gas, the rest of that energy being provided by the hot gas generator.

By closing the recirculation line, the use of hot stove waste gas can be maximized, thereby reducing to a minimum the necessity to use the hot gas generator to further heat the drying gas. Considerable savings can therefore be made by reducing the fuel gas consumption for the combustion inside the hot gas generator. It may happen that the hot stove waste gas is sufficiently hot that no further heating by means of the hot gas generator is necessary. It may even be necessary to cool down the resulting drying gas, using e.g. a water injection system, to bring the drying gas to the desired temperature at the pulverizer gas inlet.

The method according to the present invention preferably further comprises a first intermediate operating mode, wherein:
- the recirculation line is open, such that recirculation drying gas is fed at a variable flow rate to the hot gas generator;
- the hot stove waste gas line is open, such that hot stove waste gas is fed at a variable flow rate to the hot gas generator;
- the pressure of the drying gas at the pulverizer gas inlet is controlled by setting a flow rate of the drying gas in the exhaust line and by regulating the flow rate of the hot stove waste gas through the hot stove waste gas line.

Recirculation drying gas is mixed with the hot stove waste gas to form the drying gas. By controlling the mixture of the two gases, the composition of the drying gas can be adjusted. If e.g. the CO or $O_2$ concentration of the hot stove waste gas is too high, the amount of recirculation drying gas is increased by reducing the flow rate of hot stove waste gas, thereby reducing CO or $O_2$ concentration in the resulting drying gas.

The method according to the present invention preferably further comprises a second intermediate operating mode, wherein:
- the recirculation line is open, such that recirculation drying gas is fed at a variable flow rate to the hot gas generator;
- the hot stove waste gas line is open, such that hot stove waste gas is fed at a fixed flow rate to the hot gas generator;
- the pressure of the drying gas at the pulverizer gas inlet is controlled by setting a flow rate of the drying gas through the exhaust line and by regulating the position of a control damper arranged in an evacuation line.

Recirculation drying gas is mixed with the hot stove waste gas to form the drying gas. By controlling the mixture of the two gases, the composition of the drying gas can be adjusted. If e.g. the CO or $O_2$ concentration of the hot stove waste gas is too high, the amount of recirculation drying gas is increased by reducing the flow rate of hot stove waste gas, thereby reducing CO or $O_2$ concentration in the resulting drying gas.

The method according to the present invention preferably further comprises a conventional operating mode, wherein:
- the recirculation line is open, such that recirculation drying gas is fed at a variable flow rate to the hot gas generator;
- the hot stove waste gas line is shut-off, such that no hot stove waste gas is fed to the hot gas generator;
- the pressure of the drying gas at the pulverizer gas inlet is controlled by setting a flow rate of the drying gas through the exhaust line and by regulating the position of a control damper in an evacuation line.

The CO or $O_2$ concentration of the hot stove waste gas may be so high that it cannot be compensated by the addition of recirculation drying gas. In this case, the method is operated in a conventional mode wherein only recirculation drying gas is used. Also, the conventional mode allows operating the grinding and drying installation even if no hot stove waste gas is available, e.g. in case of a shut-down of the hot stove plants.

The method may switch from the hot stove waste gas operating mode to the first intermediate operating mode if the hot stove waste gas has a concentration of a predetermined component above a first concentration threshold and/or if the hot stove waste gas has a temperature below a first temperature threshold.

The method may switch from the first intermediate operating mode to the second intermediate operating mode if the hot stove waste gas has a concentration of a predetermined component above a second concentration threshold and/or if the hot stove waste gas has a temperature below a second temperature threshold.

The method may switch from the second intermediate operating mode to the conventional operating mode if a predetermined time has elapsed since the second intermediate operating mode was initiated.

The method may switch from the conventional operating mode to the hot stove waste gas operating mode at the start-up of the grinding and drying installation; or if hot stove waste gas becomes available; or if the hot stove waste gas has a concentration of a predetermined component below a third concentration threshold and/or if the hot stove waste gas has a temperature above a third temperature threshold.

The method may switch, from any operating mode, to the conventional mode if no hot stove waste gas is available, e.g. in case of a shutdown of the hot stoves plant. Although the method preferably switches directly to the conventional mode, it should not be excluded that the method may switch to the conventional mode via an intermediate mode.

The method may switch, from any operating mode, to the conventional mode if it is determined that the concentration of a predetermined component varies at a rate above a predetermined rate threshold. If sudden peaks in CO or O2 concentration occur in the hot stove waste gas, the system can operate in the conventional mode, thereby avoiding feeding drying gas with too high CO or $O_2$ concentration through the grinding and drying installation. Although the method preferably switches directly to the conventional mode, it should not be excluded that the method may switch to the conventional mode via an intermediate mode.

Advantageously, the concentration of a predetermined component in the hot stove waste gas is monitored by means of a gas analyzer arranged in the hot stove waste gas line. Advantageously, the temperature of the hot stove waste gas is monitored by means of a temperature sensor arranged in the hot stove waste gas line.

BRIEF DESCRIPTION OF THE DRAWINGS

The present invention will be more apparent from the following description of one not limiting embodiment with reference to the attached drawing, wherein.

DETAILED DESCRIPTION

Figure 1:
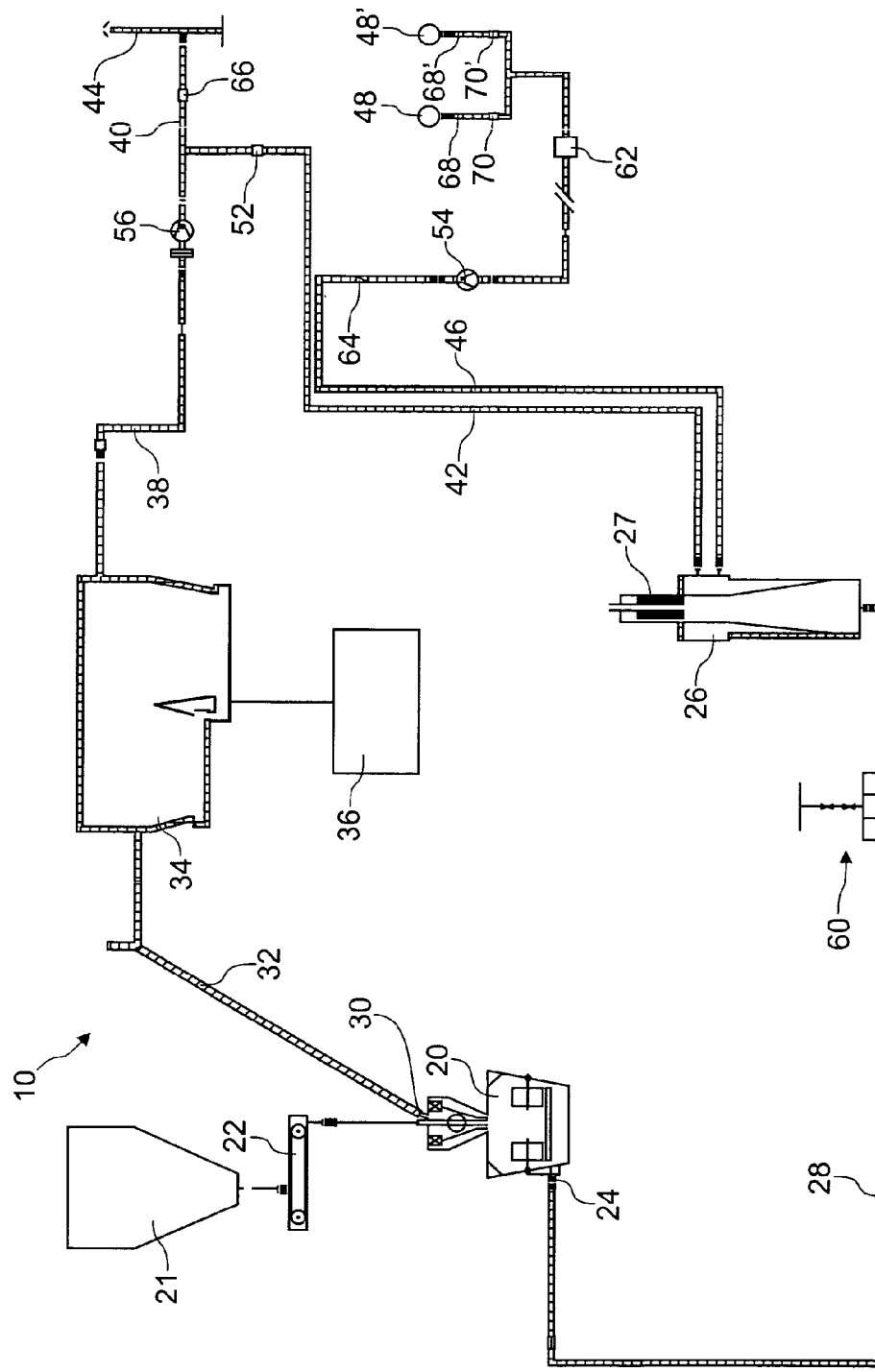
FIG. 1 shows a schematic representation of a grinding and drying installation used for carrying out the method according to the present invention.

FIG. 1 shows a grinding and drying installation for producing pulverized coal using the method according to the present invention.

Such a grinding and drying installation 10 comprises a pulverizer 20 into which raw coal is fed from a raw coal storage bin 21 via a conveyor 22. In the pulverizer 20, the raw coal is crushed between internal mobile pieces (not shown) or any other conventional grinding means into a fine powder. At the same time, a hot drying gas is fed through the pulverizer 20 to dry the pulverized coal. The drying gas enters the pulverizer 20 through a pulverizer gas inlet 24. Upstream of the pulverizer 20, the grinding and drying installation 10 comprises a hot gas generator 26 in which a drying gas can be heated to a predefined temperature. Such a hot gas generator 26 is powered by a burner 27, such as e.g. a multiple lance burner. The heated drying gas is carried from the hot gas generator 26 to the pulverizer 20 via a conduit 28. As the heated drying gas passes through the pulverizer 20, from the pulverizer gas inlet 24 to a pulverizer outlet 30, pulverized coal is entrained. A mixture of pulverized coal and drying gas is carried from the pulverizer 20, via a conduit 32, to a filter 34, where the pulverized coal is again removed from the drying gas and fed to a pulverized coal storage bin 36, ready for further use. The drying gas exiting the filter 34 is fed to an exhaust line 38 splitting into an evacuation line 40 and a recirculation line 42. The evacuation line 40 may be used to feed drying gas from the exhaust line 38 to a stack 44 for evacuating the drying gas, whereas the recirculation line 42 may be used to feed recirculation drying gas from the exhaust line 38 back to the hot gas generator 26.

The grinding and drying installation 10 further comprises a hot stove waste gas line 46 for feeding waste gas to the hot gas generator 26 from a secondary source. Such waste gas is generally hot stove waste gas recovered from one or more hot stove plants 48, 48'.

In operation, hot stove waste gas is fed to the hot gas generator 26 through the hot stove waste gas line 46 and is brought to a predefined temperature in the hot gas generator 26 and fed, as drying gas, through the pulverizer 20. The temperature of the drying gas is reduced in the pulverizer 20 as the heat from the drying gas is used to dry the pulverized coal. The level of humidity of the raw coal determines the temperature loss of the drying gas. In order to prevent damage to the filter 34, the temperature of the mixture of pulverized coal and drying gas exiting the pulverizer 20, hereafter referred to as the exit temperature, is monitored, e.g. by means of a temperature sensor (not shown).

In a hot stove waste gas operation mode, a preferred operation mode of the present invention, the recirculation line 42 is shut-off using a recirculation damper 52 arranged in the recirculation line 42 and all of the drying gas is provided by the hot stove waste gas fed into the installation through the hot stove waste gas line 46. The hot stove waste gas is blown into the installation with the help of a hot stove waste gas fan 54 arranged in the hot stove waste gas line 46. A main fan 56 is arranged in the exhaust line 38 for regulating the gas flow rate through the pulverizer 20. Operation of the main fan 56 is controlled in such a way that the gas flow rate through the pulverizer 20 is essentially constant. The pressure of the drying gas at the pulverizer gas inlet 24 of the pulverizer 20 is controlled by regulating the flow rate through the hot stove waste gas fan 54.

The temperature at the pulverizer outlet 30 is generally controlled by the output power of the burner 27 of the hot gas generator 26.

As the hot stove waste gas is subject to temperature variations, caused by the operation of the hot stove plant, such temperature variations need to be balanced. If the exit temperature decreases, more heat has to be supplied by the hot gas generator 26 and if the exit temperature increases, less heat has to be supplied by the hot gas generator 26. If the heat supplied by the hot gas generator 26 has reached a minimum and the exit temperature is still too high, the drying gas can be cooled by means of a water injection system 60 arranged downstream of the hot gas generator.

Such a water injection system 60 may also be used to improve the response time of the heating process. Indeed, the increase and decrease of heat generated by the hot gas generator 26 is relatively slow. The response time, which is of particular importance during a startup phase of the installation, may be improved by overheating the drying gas in the hot gas generator 26 and subsequently cooling it to the desired temperature by means of the water injection system 60. If the exit temperature suddenly drops well below the desired exit temperature, generally when introduction of raw coal into the pulverizer 20 begins, the temperature of the drying gas fed to the pulverizer 20 can be quickly adapted so as to keep the desired exit temperature essentially stable.

The composition of the hot stove waste gas may present undesired peaks of CO and $O_2$. The hot stove waste gas line 46 comprises a gas analyzer 62 for determining the CO and/or $O_2$ content of the hot stove waste gas. The method according to the present invention preferably comprises monitoring the CO and/or $O_2$ content of the hot stove waste gas and, should a predetermined threshold be reached, the method switches to other operating modes, e.g. in order to avoid feeding drying gas with too high CO or $O_2$ concentration through the grinding and drying installation.

The method switches from the hot stove waste gas operating mode to a first intermediate operating mode e.g. if the hot stove waste gas has a concentration of a predetermined component above a first concentration threshold and/or if the hot stove waste gas has a temperature below a first temperature threshold. The switchover may comprise opening of the recirculation damper 52 to a fixed position so as to obtain recirculation of drying gas. The position of a control damper 66 in the evacuation line 40 may also be altered. The operating point of the hot stove waste gas fan 54 is modified to reduce the flow rate of the hot stove waste gas through the hot stove waste gas line 46 in such a way as to keep the pressure of the drying gas at the pulverizer inlet 24 constant. The position of the hot stove waste gas damper 64 may also be modified. Finally, the heat output of the hot gas generator 26 is increased in order to compensate for the heat loss due to the reduction in hot stove waste gas.

The method switches from the first intermediate operating mode to a second intermediate operating mode e.g. if the hot stove waste gas has a concentration of a predetermined component above a second concentration threshold and/or if the hot stove waste gas has a temperature below a second temperature threshold. The switchover may comprise adapting the positions of the recirculation damper 52 and the control damper 66. The flow rate of the hot stove waste gas is set to a fixed flow rate by the hot stove waste gas fan 54. The position of the hot stove waste gas damper 64 may also be modified. Furthermore control of the drying gas pressure at the pulverizer gas inlet is no longer carried out by the hot stove waste gas fan 54, but by the control damper 66.

The method switches from the second intermediate operating mode to a conventional operating mode if a predetermined time has elapsed since the second intermediate operating mode was initiated. This switchover may comprise stopping the hot stove waste gas fan 54 and closing the hot stove waste gas damper 64, thereby shutting off the hot stove waste gas line 46. The position of the recirculation damper 52 may also be modified. Finally, the heat output of the hot gas generator 26 is increased in order to compensate for the heat loss due to the shutting off the hot stove waste gas line 46.

The method switches from the conventional operating mode back to the hot stove waste gas operating mode at the start-up of the grinding and drying installation; or if hot stove waste gas becomes available; or if the hot stove waste gas has a concentration of a predetermined component below a third concentration threshold and/or if the hot stove waste gas has a temperature above a third temperature threshold. Such a switchover may comprise starting the hot stove waste gas fan 54 and opening the hot stove waste gas damper 64; closing the recirculation damper 52 and adapting the control damper 66. Control of the drying gas pressure at the pulverizer gas inlet is again carried out by the hot stove waste gas fan 54 and not by the control damper 66. Also, the heat output of the hot gas generator 26 is reduced in order to compensate for the increase in hot stove waste gas fed to the hot gas generator 26.

The method switches from the hot stove waste gas operating mode to the conventional operating mode e.g. if no hot stove waste gas is available or if the available hot stove waste gas is unusable. Hot stove waste gas may not be available e.g. in case of a shutdown of the hot stove plant. Hot stove waste gas may be unusable e.g. in case of sudden peaks in the concentration of CO or $O_2$ in the hot stove waste gas.

It should also be noted that, generally, at least one hot stove plant 48 is necessary for providing a grinding and drying installation 10 with hot stove waste gas. Two or more hot stove plants 48, 48' may be connected to the hot stove waste gas line 46 via conduits 68, 68', each comprising a hot stove plant damper 70, 70'. The operation of the hot stove plant dampers 70, 70' can be used to control the hot stove waste gas temperature or to control the CO or $O_2$ concentration in the hot stove waste gas or to isolate one hot stove plant generating hot stove waste gas out of the acceptable range (e.g. temperature too low or CO or $O_2$ concentration too high).

The invention claimed is:

1. Method of producing pulverized coal, comprising:
   providing a drying gas heated to a predefined temperature in a hot gas generator;
   feeding the heated drying gas into a pulverizer;
   introducing raw coal into the pulverizer, the pulverizer grinding the raw coal into pulverized coal;
   collecting a mixture of drying gas and pulverized coal from the pulverizer and feeding the mixture to a filter, the filter separating the dried pulverized coal from the drying gas;
   collecting the dried pulverized coal for further use and feeding the drying gas from the filter to an exhaust line;
   collecting the drying gas exiting said filter and feeding part of said collected drying gas to a recirculation line for feeding recirculation drying gas to said hot gas generator
   wherein
   said step of providing said drying gas comprises feeding a variable flow rate of hot stove waste gas to said hot gas generator through a hot stove waste gas line so as to maximize the amount of hot stove waste gas used as drying gas;
   a pressure of said drying gas at a pulverizer gas inlet is controlled by regulating a flow rate of said hot stove waste gas through said hot stove waste gas line; and
   wherein
   the method comprises a hot stove waste gas operation mode and a first intermediate operating mode and the method switches from said hot stove waste gas operating mode to said first intermediate operating mode if said hot stove waste gas has a concentration of a predetermined component above a first concentration threshold and/or if said hot stove waste gas has a temperature below a first temperature threshold,
   wherein in the hot stove waste gas operating mode:
      said recirculation line is shut-off; such that no recirculation drying gas is fed to said hot gas generator;
      said hot stove waste gas line is open, such that only hot stove waste gas is fed at a variable flow rate to said hot gas generator;
      said pressure of said drying gas at said pulverizer gas inlet is controlled by a flow rate of said drying gas in said exhaust line and by regulating said flow rate of said hot stove waste gas through said hot stove waste gas line, and
   in the first intermediate operating mode:
      said recirculation line is open, such that recirculation drying gas is fed at a variable flow rate to said hot gas generator;
      said hot stove waste gas line is open, such that hot stove waste gas is fed at a variable flow rate to said hot gas generator; and
      said pressure of said drying gas at said pulverizer gas inlet is controlled by setting a flow rate of said drying gas in said exhaust line and by regulating said flow rate of said hot stove waste gas through said hot stove waste gas line.

2. Method according to claim 1, wherein said flow rate of said hot stove waste gas is regulated by means of a hot stove waste gas fan arranged in said hot stove waste gas line.

3. Method according to claim 1, wherein said flow rate of said drying gas is regulated by means of a main fan arranged in said exhaust line.

4. Method according to claim 1, wherein said method further comprises a second intermediate operating mode, wherein:
   said recirculation line is open, such that recirculation drying gas is fed at a variable flow rate to said hot gas generator;
   said hot stove waste gas line is open, such that hot stove waste gas is fed at a fixed flow rate to said hot gas generator;
   said pressure of said drying gas at said pulverizer gas inlet is controlled by setting a flow rate of said drying gas through said exhaust line and by regulating the position of a control damper arranged in an evacuation line.

5. Method according to claim 1, wherein said method further comprises a conventional operating mode, wherein:
   said recirculation line is open, such that recirculation drying gas is fed at a variable flow rate to said hot gas generator;
   said hot stove waste gas line is shut-off, such that no hot stove waste gas is fed to said hot gas generator;
   said pressure of said drying gas at said pulverizer gas inlet is controlled by setting a flow rate of said drying gas through said exhaust line and by regulating the position of a control damper arranged in an evacuation line.

6. Method according to claim 4, wherein said method switches from said first intermediate operating mode to said second intermediate operating mode if said hot stove waste gas has a concentration of a predetermined component above a second concentration threshold and/or if said hot stove waste gas has a temperature below a second temperature threshold.

7. Method according to claim 6, wherein said concentration of a predetermined component in said hot stove waste gas is monitored by means of a gas analyzer arranged in said hot stove waste gas line and/or said temperature of said hot stove waste gas is monitored by means of a temperature sensor arranged in said hot stove waste gas line.

8. Method according to claim 7, wherein said concentration of a predetermined component in said hot stove waste gas is monitored by means of a gas analyzer arranged in said hot stove waste gas line and/or said temperature of said hot stove waste gas is monitored by means of a temperature sensor arranged in said hot stove waste gas line.

9. Method according to claim 4 or 5, wherein said method switches from said second intermediate operating mode to said conventional operating mode if a predetermined time has elapsed since said second intermediate operating mode was initiated.

10. Method according to claim 9, wherein said concentration of a predetermined component in said hot stove waste gas is monitored by means of a gas analyzer arranged in said hot stove waste gas line and/or said temperature of said hot stove waste gas is monitored by means of a temperature sensor arranged in said hot stove waste gas line.

11. Method according to claim 5, wherein said method switches from said conventional operating mode to said hot stove waste gas operating mode:
   at a start-up of the grinding and drying installation; or
   if hot stove waste gas becomes available; or
   if said hot stove waste gas has a concentration of a predetermined component below a third concentration threshold and/or if said hot stove waste gas has a temperature above a third temperature threshold.

12. Method according to claim 11, wherein said concentration of a predetermined component in said hot stove waste gas is monitored by means of a gas analyzer arranged in said hot stove waste gas line and/or said temperature of said hot stove waste gas is monitored by means of a temperature sensor arranged in said hot stove waste gas line.

13. Method according to claim 4 or 5, wherein said method switches to said conventional operating mode if no hot stove waste gas is available.

14. Method according to claim 13, wherein said concentration of a predetermined component in said hot stove waste gas is monitored by means of a gas analyzer arranged in said hot stove waste gas line and/or said temperature of said hot stove waste gas is monitored by means of a temperature sensor arranged in said hot stove waste gas line.

15. Method according to claim 4 or 5, wherein said method switches to said conventional operating mode if it is determined that the concentration of a predetermined component varies at a rate above a predetermined rate threshold.

16. Method according to claim 15, wherein said concentration of a predetermined component in said hot stove waste gas is monitored by means of a gas analyzer arranged in said hot stove waste gas line and/or said temperature of said hot stove waste gas is monitored by means of a temperature sensor arranged in said hot stove waste gas line.

* * * * *